United States Patent
Goran

[11] 3,800,599
[45] Apr. 2, 1974

[54] SURGE SENSOR BASED ON ENGINE MOUNT DEFLECTION

[75] Inventor: Michael B. Goran, Bloomfield Hills, Mich.

[73] Assignee: The Bendix Corporation, Southfield, Mich.

[22] Filed: July 10, 1972

[21] Appl. No.: 270,353

[52] U.S. Cl. .................................. 73/116, 73/71.2
[51] Int. Cl. ............................................ G01m 15/00
[58] Field of Search ......... 73/117.2, 116, 118, 71.2, 73/117.3

[56] References Cited
UNITED STATES PATENTS

| | | | |
|---|---|---|---|
| 2,628,606 | 2/1953 | Draper et al | 123/102 |
| 3,596,643 | 8/1971 | Schweitzer | 123/117 A |
| 3,142,967 | 8/1964 | Schweitzer | 60/105 |
| 2,920,481 | 1/1960 | Halswit, Jr. et al. | 73/146 |
| 2,991,649 | 7/1961 | Kinsey | 73/117.2 |
| 3,498,115 | 3/1970 | Liskey | 73/71.2 |
| 3,272,005 | 9/1966 | Massa | 73/117.2 X |

OTHER PUBLICATIONS

Everett, R. L. Measuring Vehicle Driveability. 1-1 5-71 SAE Paper 710137

Schweitzer, P. H. Control of Exhaust Pollution Through a Mixture–Optimiter. 1–14–72 SAE Paper 720254

*Primary Examiner*—Jerry W. Myracle
*Attorney, Agent, or Firm*—Gerald K. Flagg

[57] ABSTRACT

A surge sensory apparatus for detecting and indicating a condition of surging, or rough running, for association with a prime mover is disclosed herein. The present invention senses engine motion and by proper signal processing including any necessary filtering, generates an output signal which may indicate the quality or degree of engine surging. A method of utilizing the surging signal so generated to provide one form of engine control which may be termed a closed loop control is also disclosed. The sensory apparatus of the present invention includes a linear motion transducer, operative to generate an electrical signal indicative of engine motion on the engine mounts which signal is indicative of the torque being developed by the engine.

3 Claims, 5 Drawing Figures

PATENTED APR 2 1974　　　　　　　　　　　　　　　　3,800,599

SURGE SENSOR BASED ON ENGINE MOUNT DEFLECTION

BACKGROUND OF THE INVENTION

1. Field of the Invention

The present invention is related to the field of parameter sensors for operative association with a prime mover. In particular, the present invention is related to that portion of the above-noted field which is concerned with the sensing of operating conditions of an internal combustion engine. More particularly still, the present invention is related to that portion of the above-noted field which is primarily concerned with the control of engine operation in response to the sensing of engine operation by suitable sensors.

2. Description of the Prior Art

The field of operational parameter sensors for prime movers has heretofore been primarily concerned with the sensing of primary parameters such as speed and output power and such secondary parameters, in the case of internal combustion engines, as air and coolant temperature, air consumption and/or manifold pressure. It is known that as the quality of engine operation begins to decrease below the optimum level, observable decreases in the primary parameters can be detected while such secondary parameters as have been mentioned hereinabove remain unchanged. Such a condition can readily be observed by the simple expedient of removing one spark plug connection in which case notable decreases in the output power of the engine can be observed while the rpm, temperature, and pressure remain substantially unchanged. Additionally, a person driving a vehicle equipped with such an engine will notice a decrease in the quality of the "drivability" of the vehicle having such an engine.

It has been determined that the quality termed "drivability," which has heretofore been more or less empirically determined by an experienced driver, is reduced by the presence of an undesired, and usually cyclic, fluctuation in engine rpm about a nominal value. This is illustrated in the graph of FIG. 2. This fluctuation is felt by the driver as a low frequency ripple in vehicle speed and is commonly called "surge".

This phenomenon is most typically the result of fluctuations in engine torque which may be felt through variations in vehicle speed as well as through variations in the engine and vehicle vibrations. To date, the best techniques for sensing these variations in torque have been on the one hand to use experienced drivers and on the other hand to use a torque cell associated with the output of the engine. Both approaches are quite unsatisfactory for the driver of the average vehicle as they involve either a great deal of experience or relatively expensive testing equipment. However, as the current emissions legislation requires a closely controlled level of engine performance in an attempt to control the exhaust emissions produced by the engine such a sensor becomes more desirable. It is therefore an object of the present invention to provide an accurate, relatively inexpensive, apparatus for determining conditions of engine performance degradation such as surging or roughness prior to the sensing of any significant degradation in any of the secondary engine parameters.

In the application of control systems to internal combustion engines in an attempt to obtain desired low levels of exhaust emissions it has been found that various air-fuel ratios and/or various concentrations of exhaust gas recirculation (EGR), for example, are desired for various types or degrees of engine operation. Additionally, other engine variables may be altered for different types of engine operation. For example, steady state operation of an engine may require one level of EGR or air-fuel ratio while acceleration or deceleration of the engine and start-up of the engine may require several different levels of air-fuel ratio or EGR or both. One method of providing continuously correct air-fuel ratios and/or amounts of EGR would require preprogrammed information concerning the requirements at each conceivable state of engine operation. On the other hand, by continuously sensing engine roughness incorrect air-fuel ratios and/or incorrect amounts of EGR may be detected by the amount of roughness induced by these inaccuracies during engine operation. It is, therefore, a further object of the present invention to provide an engine roughness sensor which may generate an output signal for a utilization device within an engine control system.

Co-pending commonly assigned patent application S.N. 249,440 "Surge Sensory Apparatus For A Prime Mover" filed on Apr. 24, 1972 by W. R. Seitz and C. K. Leung describes one solution for the above noted problem. However, the solution described in that application requires a relatively large number of mechanical, electro-mechanical and electrical elements to generate the signal having the surge-indicative component. This signal is then processed to derive the surge signal. It is, therefore, an object of the present invention to provide surge sensory apparatus which does not require the relatively extensive mechanical, electro-mechanical and electrical elements of the above-noted pending application.

SUMMARY OF THE PRESENT INVENTION

The present invention contemplates utilizing a linear motion transducer, operatively associated with the prime mover and arranged to generate an electrical signal indicative of the displacement of the prime mover relative to a selected reference. The output signal of the linear motion transducer may then reflect the instantaneous torque output, or one of the time-based derivatives of torque, of the engine and change in this signal, and hence in the torque output, properly filtered and amplified according to the teaching of the above-noted co-pending application, will yield the desired surge indicative signal.

In order to discriminate between the desird signals and low frequency oscillations which may be associated with engine vibrations induced by vehicle motion over discontinuities in a road surface or by harmonic oscillations induced by the various resiliently suspended masses (the engine as well as the vehicle body) the subsequent filtering of the signal by the associated multi-cornered filter is arranged to provide a lower frequency cutoff at about 2 Hz with a bandpass of about 3 Hz giving a high frequency cutoff of about 5 Hz.

DETAILED DESCRIPTION OF THE PREFERRED EMBODIMENT

Figure 1:
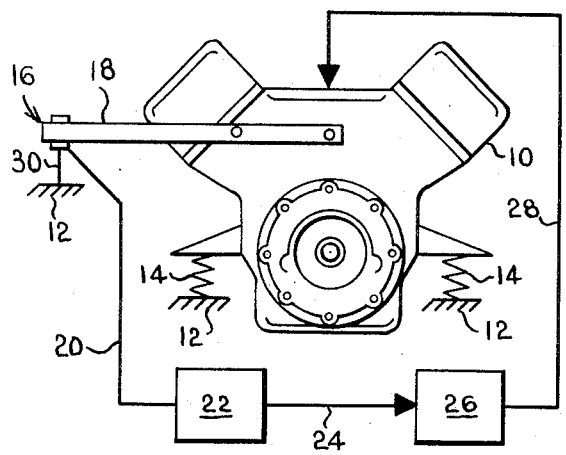
FIG. 1 shows an elevational view of an internal combustion engine and a block diagram illustrating the present invention incorporated in a closed loop engine control.

Referring now to the drawing, FIG. 1 shows an internal combustion engine 10 utilizing the present invention in a closed loop control. The engine 10 may be coupled to a frame means 12 through resilient engine mounting means 14 in the normal fashion. A linear motion sensor 16 is coupled to the engine 10 through lever arm 18 and to a portion of the frame means 12. The preferred linear motion transducer is a linear velocity transducer such as the Crescent Engineering and Research Company, Type VE velocity transducer. Another example of a suitable transducer is the linear variable differential transformer such as illustrated and described in U.S. Pat. No. 3,464,396 - "Impulse Generator" by H. Scholl. Other forms of linear motion transducers which generate electrical signals are well known. The conventional potentiometer is yet another example. However, the freedom from wear and simplicity of a linear velocity transducer makes it preferable for this use.

The known forms of linear motion transducers have relatively movable mounting means, here illustrated as anchor member 30 coupled to frame means 12 and housing member 32 coupled to lever arm 18, and electrical means, not illustrated, which generate an electrical signal indicative of, and having a linear relationship to, the relative positioning of the mounting means. Since such devices are relatively well known, further description would be superfluous.

The controller or utilization means 26 may be circuitry operative to convert a received roughness signal into a predetermined correction for an EGR valve, for the air-fuel ratio of an associated fuel delivery means for the ignition system of the engine 10, or for any combination. The nature of the controller may be to provide either a digital or an analog variation in the engine operating parameter or parameters controlled. That is, a parameter may be switched between two values in response to the roughness signal (digital) or the parameter may be varied over a range of values in response to the magnitude and/or the duration of the roughness signal. The controller 24 may also include sufficient hardware, in the form of the necessary valving, actuators, etc. to implement the degree and type of control desired.

Figure 2:
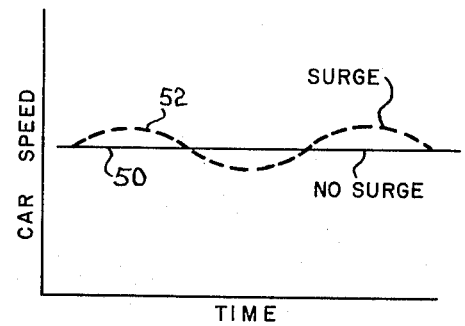
FIG. 2 is a graph illustrating the surge phenomena.

Referring now to FIG. 2, a graph is shown which illustrates the surging phenomena. The "No Surge" line identified as 50 is representative of engine operation at a substantially constant rpm value. In actuality, this signal may include a relatively high frequency sine wave (ripple) component having a frequency in excess of 20 Hz. and a peak-to-peak amplitude of no more than 12 rpm at an average signal level of 1,200 rpm. By comparison, the surge signal 52 represents a cyclic or sine wave type signal having a significantly higher peak-to-peak amplitude (in excess of 20 rpm) at the same average rpm and a frequency in the neighborhood of from about 2 Hz to about 5 Hz. It is this signal which the present invention is intended to isolate and utilize.

Figure 3:
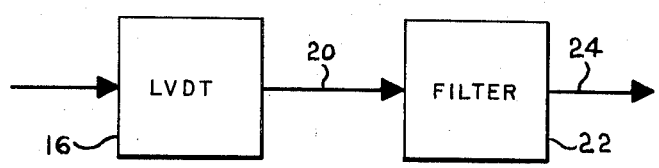
FIG. 3 is a block diagram illustrating the signal processing to accompany the present invention.

Referring now to FIG. 3, the apparatus of the present invention is illustrated in a block diagram. The linear motion transducer 16 communicates the desired signal to the surge sensor circuitry 22 which in this instance is illustrated as a differentiator with a multicornered filter. Adequate filtering is achieved with a two-cornered filter and the filtering may have greatly improved selectivity of the bandpass region if a larger number of corners are provided in the filtering and are made to substantially coincide. The output of the surge sensor circuitry 22 is then communicated as the roughness signal over conductor 24 to the utilization device 26.

Figure 4:
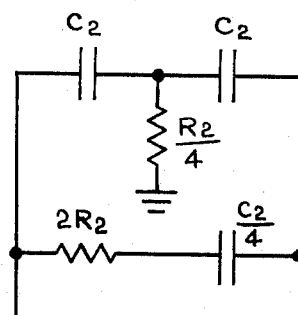
FIG. 4 is a circuit diagram for one portion of the block diagram of FIG. 3.
Figure 4:
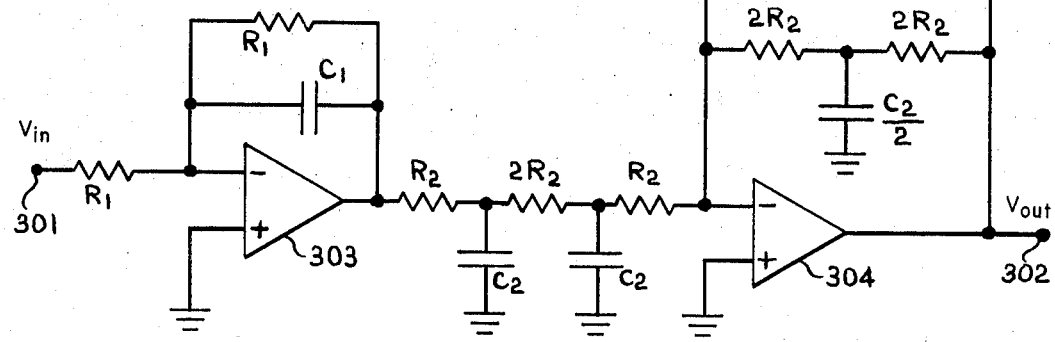

Referring now to FIG. 4, the surge sensor circuitry of the present invention will be illustrated in an embodiment which corresponds to the block diagram of FIG. 3. The circuitry comprises input terminal 301 for receipt of the $V_{in}$ signal, output terminal 302 for transmittal of the $V_{out}$ signal, a pair of serially connected amplifiers 303, 304 and various RC circuitry components arranged as feedback around each amplifier and to control the interconnection of the amplifiers to each other, to the terminals and to ground. The various resistors and capacitors illustrated are denoted as being $R_1$, $R_2$, $C_1$, $C_2$ or various fractional or multiple values thereof. The circuitry illustrated may be represented by the equation:

$$V_{out} = V_{in}/(1+R_1C_1S)(1+R_2C_2S)[1+R_2c_2S + (R_2C_2S)^2]$$

1.

The bandpass region is controlled by the relationship:

$$f_{bp} = 1/R_1C_1$$

2.

the high frequency cutoff is controlled by the equation:

$$f_H = 1/R_2C_2$$

3.

and the low frequency cutoff is controlled by the equation:

$$f_L = f_H - f_{bp}$$

4.

For a typical application of the present invention, the values of $R_1$, $C_1$, $R_2$ and $C_2$ are selected to yield solutions to equations 2 and 3 of approximately 3Hz and 5Hz, respectively. It will be recognized of course that other values of the bandpass region and high frequency cutoff may be selected to accommodate differences in suspended masses and different selected cutoff levels in detected surge. With respect to Equation 1, the input voltage $V_{in}$ is the signal on signal lead 20 while the output voltage signal $V_{out}$ is the signal appearing on signal lead 24.

Figure 5:
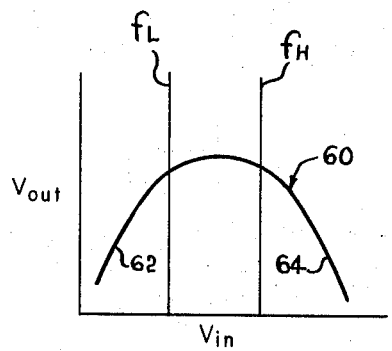
FIG. 5 is a graph of the performance of the circuit of FIG. 4.

Referring now to FIGS. 4 and 5, a graph 60 of the performance of the FIG. 4 circuitry is illustrated. The graph illustrates the output signal, $V_{out}$, as a function of the relative engine displacement with the significant frequency values denoted as $f_{bp}$ and $f_H$.

The slope 62 of the graph 60 below the $f_{bp}$ frequency is determined by the signal generated by the linear motion transducer while the slope 64 of the graph 60 above the $f_H$ frequency is determined by the circuitry associated with amplifier 304.

As can be seen, the present invention readily accomplishes the stated objectives. By sensing the moment-to-moment motion of the engine relative to a fixed frame of reference the incremental accelerations which are a result of the surging phenomena can be detected. By applying the output of the linear motion transducer 16 to the circuitry of FIG. 4, a usable output signal is derived as illustrated in FIG. 5 which may be used to control a utilization device 26 which may take the form of an air-fuel ratio control or an EGR control valve. Depending upon the maximum roughness with which the associated engine may be permitted to operate, a threshold level of signal can be established so that at a predetermined percentage of the maximum amplitude of the signal the utilization device initiates the corrective action.

I claim:

1. A roughness sensor for indicating roughness of a prime mover system in excess of a predetermined level comprising:

a frame;

a prime mover resiliently coupled to said frame;

transducer means having a pair of relatively movable mounting means coupled to the prime mover and to the frame means by the pair of relatively movable mounting means;

said transducer means having electrical means interconnecting said mounting means operative to generate a roughness signal which is a linear function of the relative position of said pair of mounting means; and circuit means arranged to receive said signal including means operative to generate an output signal when the magnitude of said roughness signal exceeds a threshold level selected in accordance with the maximum roughness desired for said prime mover.

2. The system as claimed in claim 1 wherein said transducer means comprise a linear motion transducer.

3. A roughness sensor for indicating excessive engine roughness comprising:

a. an internal combustion engine having a roughness condition the magnitude of which varies in accordance with fluctuations in engine torque, said engine comprising member means movable relative to a selected reference to effect displacements therebetween varying with the magnitude of said fluctuations in engne torque;

b. transducer means operatively coupled to said member means and said reference for generating a roughness signal varying with the magnitude of said displacements; and c. utilization means operatively connected to said transducer means for generating an output signal varying with the magnitude of said roughness signal in excess of a predetermined threshold level selected in accordance with the maximum roughness desired for said engine.

* * * * *